Sept. 3, 1940.     W. D. BANCROFT ET AL     2,213,619
FERTILIZER MIXTURE
Original Filed Oct. 21, 1937
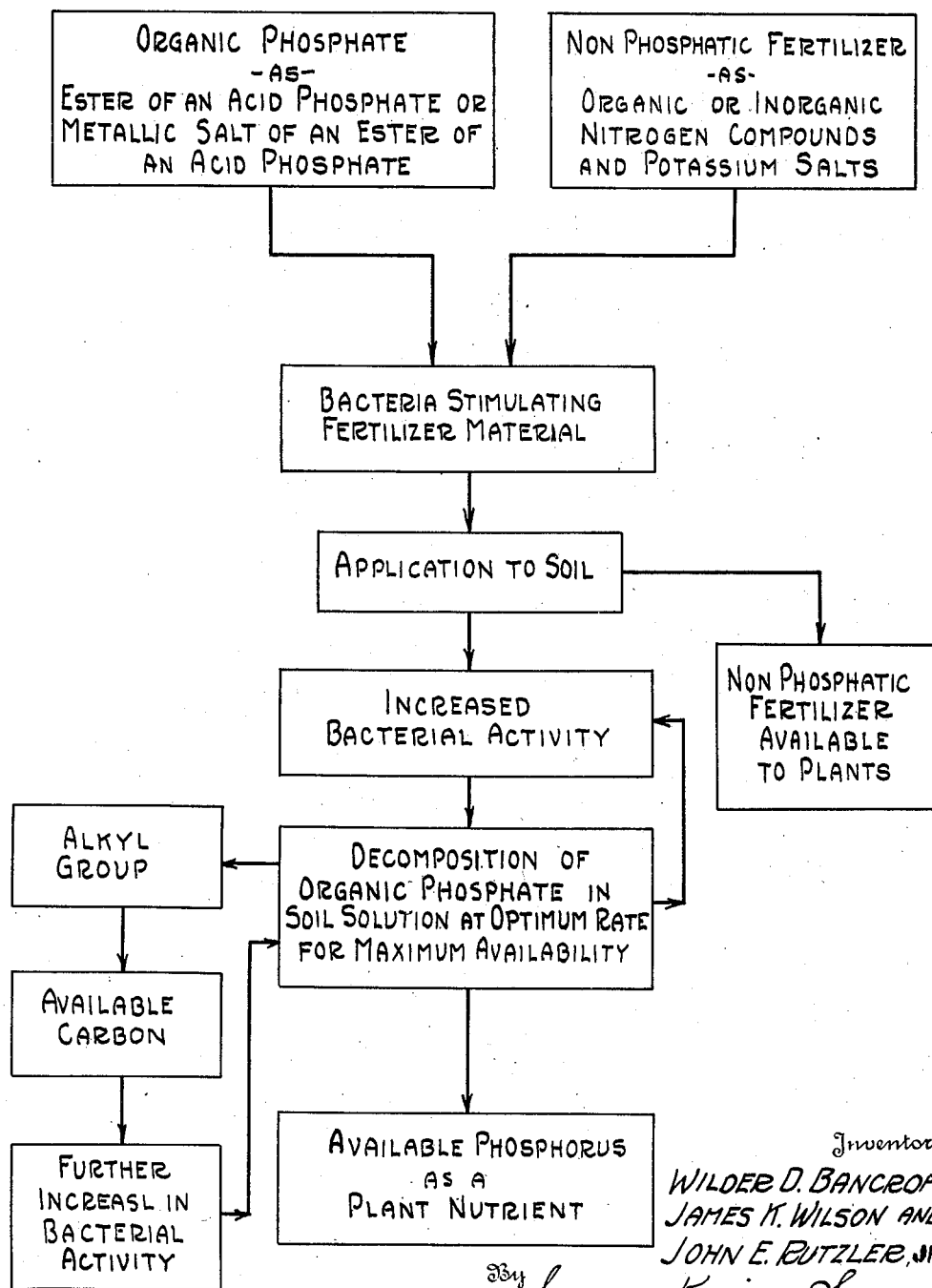

Patented Sept. 3, 1940

2,213,619

UNITED STATES PATENT OFFICE 2,213,619

FERTILIZER MIXTURE

Wilder D. Bancroft, James K. Wilson, and John E. Rutzler, Jr., Ithaca, N. Y.

Substitute for abandoned application Serial No. 170,289, October 21, 1937. This application August 2, 1938, Serial No. 222,694

7 Claims. (Cl. 71—27)

Our invention relates to mixtures of fertilizing materials and more particularly to the mixtures of soluble organic phosphatic materials, which revert slowly when in contact with the soil, with other compounds which will cause them to decompose in the soil with more rapidity. This application is substituted for our co-pending application Serial No. 170,289, filed October 21, 1937.

We have found experimentally that organic phosphates, containing the alkyl radical, such as were described in our co-pending applications Serial No. 119,680 and 170,288 which were filed on January 8, 1938 and October 21, 1937, respectively, are not available for the use of many types of growing plants until the alkyl radical has split off in the soil solution. As this reaction does not take place for several weeks after the organic phosphates are applied to the soil, it is obvious that with certain types of crops relatively little of the phosphorus or carbon in these organic phosphates would be available during the first part of the growing period.

An object of our invention is to increase the rate at which the phosphorus and carbon of organic phosphates become available to the plant by incorporating therewith fertilizer materials which will hasten the decomposition of said organic phosphates in the soil by stimulating bacterial activity to the optimum degree at the optimum time.

The single sheet of drawing shows a diagrammatic representation of our invention.

In our co-pending application Serial No. 170,288, filed October 21, 1937, it was shown that organic phosphates such as propyl and isopropyl phosphates and their metallic salts, none of which have more than one hydroxyl group attached to the carbon atom, are excellent phosphatic fertilizing materials which possess new and novel properties. We have found, however, that the effectiveness of these materials and other organic phosphates is enhanced by applying them to the soil in admixture with other, common, fertilizing materials such, for example, as organic and inorganic nitrogen compounds and potassium salts.

As previously mentioned some plants, such as corn and Cayuga soy beans, seem able to utilize the phosphorus and other nutritive elements in our organic phosphates as soon as these fertilizing materials are placed in the soil. On the other hand, white London mustard, tomatoes, millet, barley and buckwheat, among others, have been found to obtain the phosphorus from our organic phosphates much more readily after they lose their alkyl group as a result of decomposition in the soil. It is probable that most crop plants will behave towards our organic phosphates in the manner of White London mustard.

A period of about a month elapses after introduction of our organic phosphates into the soil before they are largely decomposed, and are therefore of maximum availability, as the result of the splitting off of the alkyl groups which they contain. This time factor, of course, varies in duration depending on the type of the soil, hydrogen ion concentration of the soil solution, amount of soil moisture, the particular organic phosphate used, and to a large extent on the presence of other fertilizer materials in the soil and the time that these other fertilizer materials are added to the soil in relation to the time that the organic phosphate is put on the land. Other less important processes also play roles in determining the rate of break-down of our organic phosphates in the soil.

As previously stated, the present invention is concerned mainly with the connection between this rate of break-down of these organic phosphates and the presence of other fertilizer materials in the soil. The rates of decomposition of said organic phosphates in the soil have been found to be intimately connected with the time that these other materials are applied to the soil in relation to the time that the organic phosphate is put on the land. Our invention therefore is to provide mixtures of fertilizing materials the phosphatic ingredients of which are stable enough to diffuse through that portion of the soil profile which is occupied by the roots of the growing plants; the remaining ingredients being capable of stimulating bacterial activity in the soil and being available for plant use immediately upon application.

Fertilizer materials are usually applied to the land at times when it so happens that the soil moisture is at a high level. This condition makes for a rapid distribution of organic phosphates through the soil so that in a period of about ten days they will be widely, deeply and uniformly distributed. Yet, under a variety of conditions these compounds do not reach their greatest degree of availability, owing to the time required to split off the alkyl group, until they have been in the soil for from a month to six weeks. During the interval between approximately ten days and the time when the phosphorus in these compounds becomes most available to the plants, the plants do not obtain the amount of phosphorus that they require for best growth. Therefore we have found it desirable to decompose said organic phosphates as soon as possible after they have become well distributed through the soil.

We have found that this can be accomplished by applying to the land a mixed fertilizer containing one or more organic phosphates such as, for example, diethyl phosphate, calcium ethyl phosphate, calcium methyl phosphate, diisopropyl phosphate or triisopropyl phosphate, and other, non-phosphatic, fertilizer materials such as, for example, sodium nitrate; ammonium sulphate; potassium salts. These and other non-phosphatic fertilizer materials increase the activity of the microorganisms and the mineralization of the nitrogen in the soil and as a result of this increased activity the decomposition of the organic phosphate is hastened.

We have also discovered that it is advantageous to apply the organic phosphate and the non-phosphatic fertilizer to the soil in the form of a mixture rather than applying them separately. If the organic phosphate is applied before the non-phosphatic fertilizer the advantages of a mixture of the ingredients are partially lost because, in the first place, the organic phosphate will tend, due to the time advantage, to reach the sub-soil before the bacterial stimulating fertilizers do. As a result, the full effect of the decomposing action resulting from the increased bacterial activity will not be obtained. Of course, the degree to which the full effect of the decomposing action on the organic phosphate will be lost will depend upon what non-phosphatic fertilizer is applied after the organic phosphate. In the case of ammonium sulphate, for example, a great deal of the stimulating effect of the ammonium part of this compound on the bacteria will be lost because the ammonium ion has a limited mobility in the soil and will not spread quickly as far as the organic phosphate has spread; while in the case of the much more mobile, in the soil, nitrate ion from sodium nitrate much less of the effect will be sacrificed by applying it after the organic phosphate. Furthermore, if either the organic phosphate, or the non-phosphatic fertilizer is applied to the land before the other, there will be a large number of small areas in any given field, and consequently of the soil profile, in which the proximity of the two fertilizer materials will not be as close as is desirable to bring about the maximum decomposing action of the soil microorganisms on the organic phosphate.

In the second place, if the non-phosphatic fertilizer is put on the land before our organic phosphate we do not obtain such good results as when a mixture of the two is used. This is because the stimulating effects of the organic phosphates themselves on the bacteria do not coincide in time with those of the non-phosphatic fertilizers, and as a result, by way of illustration, more of the potassium and ammonium ions become fixed in the soil complex, and more of the nitrate diffuses away from the scene of action, all of which causes a reduction in bacterial activity from what may be obtained from a mixture. The abovementioned proximity factor also contributes to a loss of the maximum effect brought about by a mixture. Therefore, in order to achieve optimum conditions for the effectiveness of our organic phosphates as carriers of the essential plant nutrient, phosphorus, we have invented mixtures of said organic phosphates and non-phosphatic fertilizers for application to the land.

Our invention comprises mixtures of any one or more of the organic phosphates characterized by being a reaction product between a monohydric alcohol and an acid of phosphorus with any other non-phosphatic fertilizer or fertilizers which singly or in combination stimulate the activity of soil microorganisms. When applied to the land, the organic phosphate in our mixtures acts to stimulate the growth of the soil microorganisms and to supply phosphorus to the plant; while the non-phosphatic fertilizer material acts as a plant nutrient and at the same time it stimulates the growth of the soil microorganisms which organisms in turn increase the rate of decomposition of the organic phosphate so that the phosphorus therein becomes available as a plant nutrient sooner than it otherwise would, all of the components of the mixture acting together to bring about optimum conditions for the distribution and utilization of the phosphorus in the organic phosphate. The following are examples of fertilizer mixtures which accomplish the desired results when applied to the land; they are given by way of illustration only and our invention is not to be construed in any way as being limited thereto.

*Example*

This is an example of our invention wherein organic phosphates are mixed with other, non-phosphatic, fertilizer materials to form a complete fertilizer ready for application to the soil. At least part of each compound in each mixture serves both as a nutrient to stimulate the growth of bacteria and as a nutrient for crop plants, the results of the bacterial stimulation being to increase the efficiency of the said organic phosphate.

(1)

|  | Pounds |
|---|---|
| Sodium nitrate | 200 |
| Potassium chloride | 100 |
| Diethyl monocalcium phosphate | 110 |

(2)

| Ammonium sulphate | 100 |
|---|---|
| Sodium nitrate | 100 |
| Potassium chloride | 100 |
| Diethyl monocalcium phosphate | 50 |
| Monoethyl dicalcium phosphate | 50 |

(3)

| Ammonium sulphate | 125 |
|---|---|
| Sodium nitrate | 75 |
| Monomethyl dicalcium phosphate | 75 |
| Dimethyl monocalcium phosphate | 75 |

In mixture number one the nitrate of the sodium nitrate and the potassium in the potassium chloride increase the rate of growth of the soil microorganisms which in turn help to speed up the decomposition of the organic phosphate, the phosphorus and the alkyl group of the organic phosphate at the same time aiding the other bacterial nutrients in increasing its own rate of decomposition. All of these actions take place approximately simultaneously with the new and novel result that the organic phosphate becomes well distributed throughout the soil profile and more available as a plant nutrient sooner than would be the case if the non-phosphatic fertilizers were not present or were applied to the soil at a different time than the organic phosphate.

Mixture number two functions, in contact with the soil, in approximately the same way except that, due to the presence of both ammonium and nitrate ions, more types of soil microorganisms are stimulated to increased growth. This, in turn, results in more effective decomposition of the organic phosphate.

The components of mixture number three function in the same manner as those of mixture number one. While definite proportions of specified plant nutrients and bacterial stimulants are given above, they are given merely by way of illustration, and our invention is not to be considered as limited thereto.

Other nitrogen carriers than those mentioned may be substituted in our fertilizer mixtures without departing from the substance of our invention, provided that said other nitrogen carriers function to increase the rate of growth of the microorganisms in the soil. In the same sense other potassium compounds than those mentioned may be employed. Likewise, other compounds which do not contain either nitrogen or potassium may be included in fertilizer mixtures along with organic phosphates provided said other compounds increase bacterial activity in the soil. By way of illustration small amounts of copper, zinc and/or manganese salts may be incorporated in such mixtures as these and will be within the scope of this invention. Also, any of the organic phosphates formed by the interaction of a compound of phosphorus and a monohydric alcohol with or without the subsequent addition of salts or any mixture thereof may be substituted for those given in the above mixtures. The amounts of the different substances in the above mixtures may be varied within wide limits depending on the soil to which they are to be applied and its previous fertilizer history and the crop which is to be grown on the land, as will be evident to anyone skilled in the art.

While we have described the preferred forms of our invention, it is obvious that many modifications may be made therein by one skilled in the art, and therefore we wish the concept of our invention to be limited only by the prior art and the scope of the appended claims.

We claim:

1. A new fertilizer comprising a mixture of at least two inorganic salts selected from a class consisting of sodium nitrate, potassium chloride and ammonium sulphate, and a metallic salt of an acid ester of phosphorus having less than two hydroxyl groups attached to carbon, the mixture being composed of not more than three parts by weight of the selected inorganic salts to one part by weight of the organic phosphate, said quantity of inorganic salts being adequate to stimulate the growth of soil micro-organisms with sufficient rapidity to cause the decomposition of the organic phosphate while it is still in a position in the soil to be readily available to the plant.

2. A new fertilizer comprising a mixture of sodium nitrate, potassium chloride, and a metallic salt of an acid ester of an acid of hosphorus having less than two hydroxyl groups attached to carbon, the mixture being composed of three parts by weight of the inorganic salts to one part by weight of the organic phosphate, said proportions being adequate to stimulate the growth of soil micro-organisms with sufficient rapidity to cause the decomposition of the organic phosphate while it is still in a position in the soil to be readily available to the plant.

3. A new fertilizer comprising a mixture of sodium nitrate, potassium chloride, ammonium sulfate in equal proportions by weight, and a metallic salt of an acid ester of an acid of phosphorus having less than two hydroxyl groups attached to carbon, the mixture being composed of three parts by weight of the inorganic salts to one part by weight of the organic phosphate, said proportions being adequate to stimulate the growth of soil micro-organisms with sufficient rapidity to cause the decomposition of the organic phosphate while it is still in a position in the soil to be readily available to the plant.

4. A new fertilizer comprising a mixture of sodium nitrate, ammonium sulfate, and a metallic salt of an acid ester of an acid of phosphorus having less than two hydroxyl groups attached to carbon, the mixture being composed of two parts by weight of the inorganic salts to one and a half parts by weight of the organic phosphate, said proportions being adequate to stimulate the growth of soil micro-organisms with sufficient rapidity to cause the decomposition of the organic phosphate while it is still in a position in the soil to be readily available to the plant.

5. A new fertilizer composed of a mixture of relatively unstable, sparingly soluble, organic phosphates and inorganic salts having plant nutrient values, said salts being present in proportions which are adequate to stimulate the growth of soil organisms with sufficient rapidity to cause the decomposition of the organic phosphates while they are in a position in the soil where they are readily available to the plant, said fertilizer mixture having the following approximate composition:

|  | Pounds |
|---|---|
| Sodium nitrate | 200 |
| Potassium chloride | 100 |
| Diethyl monocalcium phosphate | 110 |

6. A new fertilizer composed of a mixture of relatively unstable, sparingly soluble, organic phosphates and inorganic salts having plant nutrient values, said salts being present in proportions which are adequate to stimulate the growth of soil organisms with sufficient rapidity to cause the decomposition of the organic phosphates while they are in a position in the soil where they are readily available to the plant, said fertilizer mixture having the following approximate composition:

|  | Pounds |
|---|---|
| Ammonium sulphate | 100 |
| Sodium nitrate | 100 |
| Potassium chloride | 100 |
| Diethyl monocalcium phosphate | 50 |
| Monoethyl dicalcium phosphate | 50 |

7. A new fertilizer composed of a mixture of relatively unstable, sparingly soluble, organic phosphates and inorganic salts having plant nutrient values, said salts being present in proportions which are adequate to stimulate the growth of soil organisms with sufficient rapidity to cause the decomposition of the organic phosphates while they are in a position in the soil where they are readily available to the plant, said fertilizer mixture having the following approximate composition:

|  | Pounds |
|---|---|
| Ammonium sulphate | 125 |
| Sodium nitrate | 75 |
| Monomethyl dicalcium phosphate | 75 |
| Dimethyl monocalcium phosphate | 75 |

WILDER D. BANCROFT.
JAMES K. WILSON.
JOHN E. RUTZLER, Jr.